United States Patent [19]

Kizilbash

[11] Patent Number: 4,680,710
[45] Date of Patent: Jul. 14, 1987

[54] COMPUTER COMPOSITION OF NASTALIQ SCRIPT OF THE URDU GROUP OF LANGUAGES

[76] Inventor: Akeel H. Kizilbash, 2/51-G,P.E.C.H.S., Karachi-29, Pakistan

[21] Appl. No.: 673,195

[22] Filed: Nov. 19, 1984

[51] Int. Cl.⁴ .................. G06F 15/38; G06F 7/60; G09G 1/18; B41J 5/00
[52] U.S. Cl. ............................. 364/419; 178/30; 400/111
[58] Field of Search ............ 178/23 R, 28 R, 30; 340/365 S, 732, 790; 400/19, 111; 364/419

[56] References Cited

U.S. PATENT DOCUMENTS

| | | | |
|---|---|---|---|
| 1,403,329 | 1/1922 | Khalil | 400/111 |
| 3,938,099 | 2/1976 | Hyder | 400/19 X |
| 4,286,329 | 8/1981 | Goertzel et al. | 178/30 X |
| 4,505,602 | 3/1985 | Wong | 364/419 X |
| 4,511,267 | 4/1985 | Pokorny et al. | 178/30 X |
| 4,527,919 | 7/1985 | Aoun | 178/30 X |
| 4,604,712 | 8/1986 | Orrhammar | 340/732 X |

FOREIGN PATENT DOCUMENTS 1176523  1/1970  United Kingdom ............ 400/111

*Primary Examiner*—E. A. Goldberg
*Assistant Examiner*—Patrick W. Foster
*Attorney, Agent, or Firm*—Ralph L. Marzocco

[57] ABSTRACT

A method is disclosed for computer composition of Nastaliq script and similar Ruka'ah script of the Urdu group of languages (Arabic, Persian, Punjabi, Pushto, Sindhi) in full conformance to rules of a script. Basic constituent elements of the characters of scripture are stored in a computer memory and these elements in response to user command are joined with each other, as required, to compose scripture according to a set of rules defined and stored in a rules dictionary. Combinations of characters that do not conform to the general rules contained in the dictionary are treated and executed as exceptional cases by the computer program. Moreover, an efficient mapping of Urdu characters to the existing QWERTY keyboard is achieved by matching character frequency of occurrence to finger agility, by pattern recognition features of similar characters, and by rationalizing the overall finger workload.

13 Claims, 4 Drawing Figures

| | | | | | | |
|---|---|---|---|---|---|---|
| ق | KKAF | | | | آ ا | ALIF |
| ک گ | KAF | | | ث ٹ ت پ ب | BAY |
| ل | LAAM | | | خ ح چ ج | JEEM |
| م | MEEM | | | ذ ڈ د | DAL |
| ن ں | NOON | | | ژ ز ڑ ر | RAY |
| و | VOW | | | ش س | SEEN |
| ہ | HA | | | ض ص | SOAD |
| ٔ | HUMZA | | | ظ ط | TOYE |
| ی | CHOTI YE | | | غ ع | AN |
| ے | BARI YE | | | ف | FAY |
| ھ | DCH | | | | |

COMPUTER COMPOSITION OF NASTALIQ SCRIPT OF THE URDU GROUP OF LANGUAGES

BACKGROUND OF THE INVENTION

1. Field of the Invention

The present invention generally relates to the computer composition of Nastaliq script of Urdu scripture of the languages of Punjabi, Sindhi and Pushto and the similar Ruka'ah script of the languages of Arabic and Persian. More particularly, the invention relates to the decomposition of Urdu scripture into constituent elements defined in accordance with pattern recognition principles, their digitization and storage in a computer memory. Upon command, scripture is composed in Nastaliq or similar Ruka'ah script in conformance with a set of rules governing the selection and combination of elements stored in the computer memory.

2. Description of the Prior Art

The mechanization of true Nastaliq and Ruka'ah script of the Urdu group of languages has always remained a formidable problem. Unlike the Roman character based languages in which individual characters retain their whole shape and are not joined with neighboring characters in a word, characters of the Urdu group of languages can take on a variety of cursive shapes when joined with each other. These cursive shapes called shoshas may either comprise a representative part of a whole character shape or their shape may be altogether different from a character they represent.

Shoshas join with each other and with whole characters to form a connected body of scripture called a ligature. The selection of a particular shosha of a character depends upon the neighboring characters in a ligature. Urdu characters, however, do not appear in a single horizontal line, but instead have vertical placements of their own with the vertical positioning of shoshas depending upon the neighboring elements in the ligature. Additionally, the width of characters and shoshas differ very widely, requiring their horizontal positioning to be carefully manipulated so that when these elements juxtapose to compose the Nastaliq or the similar Ruka'ah script, the ligature bodies thus formed should have no undersirable jagged joints and should appear to be drawn by a continuous ductus of a calligraphic pen.

In true Nastaliq and Ruka'ah script, the characters and shoshas have a varying thickness along their body lengths as shown in FIG. 3. This further complicates ligature formation and requires matching the thickness of the shoshas at the joints to obtain an elegant ligature.

In complex ligatures diacritic marks (generally diamond shape marks used to distinguish characters which are similar in form) frequently need to be repositioned to prevent them from clashing with each other or the body of the ligature. Horizontal spacing between ligatures and characters is variable and is determined by a separate set of rules. Horizontal overlap between ligatures and even words is common, saves space and is unambiguous to the reader.

Vowel sounds in the script are represented by a second set of diacritic marks called Araab. These diacritic marks, if used, occur either above or below their associated shosha or character depending upon the type of Araab.

All of the above complexities have historically obstructed the machine composition of Nastaliq or Ruka'ah script in its true elegance and style. Although various attempts have been made at the mechanization of the script, all of them have distorted Nastaliq and Ruka'ah script to varying extents to suit technological limitations. Initially two shapes: the whole character and a single shosha (to be used when the character occurs in the beginning or middle of a ligature) were introduced for most of the characters. This not only seriously distorted the script but also many combinations could not be implemented.

A system of differential space was introduced whereby all characters and shoshas were made to have two possible widths. But this simplification deforms the script since shoshas and characters are of many different widths. The varying thickness along the body length of character and shosha bodies was reduced so that the joints could be simplified resulting in the degradation of the script. Moreover, the shoshas and the characters were so designed that the vertical levels of the joints were fixed for ease of ligature formation. Shoshas were widened and their joints were arranged to take place on a single horizontal line to prevent diacritic marks from clashing with each other or with the ligature body. All these simplifications had a drastic effect on the elegance of Nastaliq script and the script resembled what is known as Naskh style.

Many writers of the script continue to write manually in the Nastaliq style because of its ease and elegance but are forced to read printed material in the Naskh style due to lack of Nastaliq printing. Currently, some of the severe distortions of the script have been resolved by the advent of computers and optical printing techniques. The possible shapes of shoshas have been increased and stored in the computer's memory relieving typists of having to select character shapes.

But the emulation of the true Nastaliq style could not be achieved until recently and the Naskh style appears to have become the de-facto standard in Arabic and Persian communities. However in Pakistan and India the hand calligraphed Nastaliq script is preferred over the type Naskh script which causes almost all the Urdu literature in these countries to be initially manuscripted and thereafter printed by conventional means.

In 1981 Jamil and Saiyid disclosed a scheme to mechanize Nastaliq script. With the cooperation of the Monotype Company of England, they calligraphed, digitized, and stored in a computer memory a dictionary of the sixteen thousand most commonly used fully-formed Urdu ligatures. These stored ligatures were used to form words and subsequently were printed with a laser printer. Although a significant breakthrough for printing Nastaliq script, the Jamil-Monotype machine is limited to printing only those words whose ligatures are already stored in the computer's memory. This not only requires a mammoth memory but words for which ligatures are not stored in the memory cannot be printed. This problem is especially pronounced in the printing of proper nouns and remains open-ended. Also the process is inordinately expensive and suitable only for huge printing jobs such as newspapers and mass-circulation magazines. The technique described hereinafter resolves all of the above complexities and prints true Nastaliq with very economical use of computational effort and memory.

SUMMARY OF THE INVENTION

In accordance with the present invention computer composition of Urdu Nastaliq is accomplished by defining an expanded character set for the language. An efficient mapping of Urdu characters to the English-language standard QWERTY (the left-to-right sequence of the first six letters of the top row of keys) keyboard is achieved by matching character frequency of occurrence to finger agility and by applying pattern recognition concepts. An analysis of finger work loads is then used to make final adjustments to the layout of the keyboard. Although the keyboard layout conforms to characacter occurrence frequency of random Urdu text, it is adaptable to other languages as well.

Urdu scripture is decomposed into constituent elements which are defined in accordance with pattern recognition principles, digitized, and stored in a computer memory. In response to user command elements are joined with each other, as required, to compose scripture according to a set of rules defined and stored in a rules dictionary. The overall scripture composition process is applicable to video communications and display systems, laser, optical and dot matrix printing devices, typewriters, teleprinters, and terminals for typesetting and data processing systems.

It is therefore an object of the present invention to provide a novel method to computer compose high quality Nastaliq (Ruka'ah) script for displaying and preparing documents in the above-mentioned script for the Urdu group of languages.

It is a further object of the invention to provide an efficient data input keyboard whose key arrangement for the Urdu group of languages is based on the frequency of character occurrence in random text matched with finger agility, pattern recognition features of the character set, minimal use of the shift key, and rationalization of the overall finger workload.

Another object of the invention to provide a Nastaliq font in which character, shosha, and diacritic mark shapes have been optimized and standardized according to pattern recognition principles so that every character, shosha, and diacritic mark may be defined as a combination of distinct parts called the body group, rest group, and diacritic mark group.

Still another object of the invention is to provide a set of rules for automatically selecting, composing, and combining character entry from the input device; and for automatically detecting end of ligature characters, correctly displaying both single and multiple character ligatures, providing minimum interligature spacing consistent with good readability and maintaining proper vertical positioning of characters and ligatures.

Yet another object of the invention is to provide an efficient word processing technique on an operator's electronic terminal.

Achievement of the above and other objects and advantages which will be apparent from a reading of the following disclosure and overcoming of the shortcomings and disadvantages of the prior art have preceded in the case of the present invention from the discovery by the instant inventor that a set of syntax-based computer programs, when applied to strings of input characters in the Urdu group of languages, generates well-formed ligatures and a keyboard layout design based on a character-to-key mapping obtained by matching character frequency with finger agility, using pattern recognition principles in character pairing, and rationalizing of the finger work loads.

BRIEF DESCRIPTION OF THE DRAWINGS

For a further understanding of the nature and object of the invention, reference should be had to the detailed description of the exemplary embodiment taken in connection with the appended drawings in which:

FIG. 3 is a chart of the names and members of character families of the expanded set as defined for the instant method for computer composition of Nastaliq script.

FIG. 4 is an arbitrarily complex ligature formed by the instant method according to the rules of Nastaliq script by typing in the whole character as shown and ending the word by a space entry.

DESCRIPTION OF A PREFERRED EMBODIMENT

Figure 1:
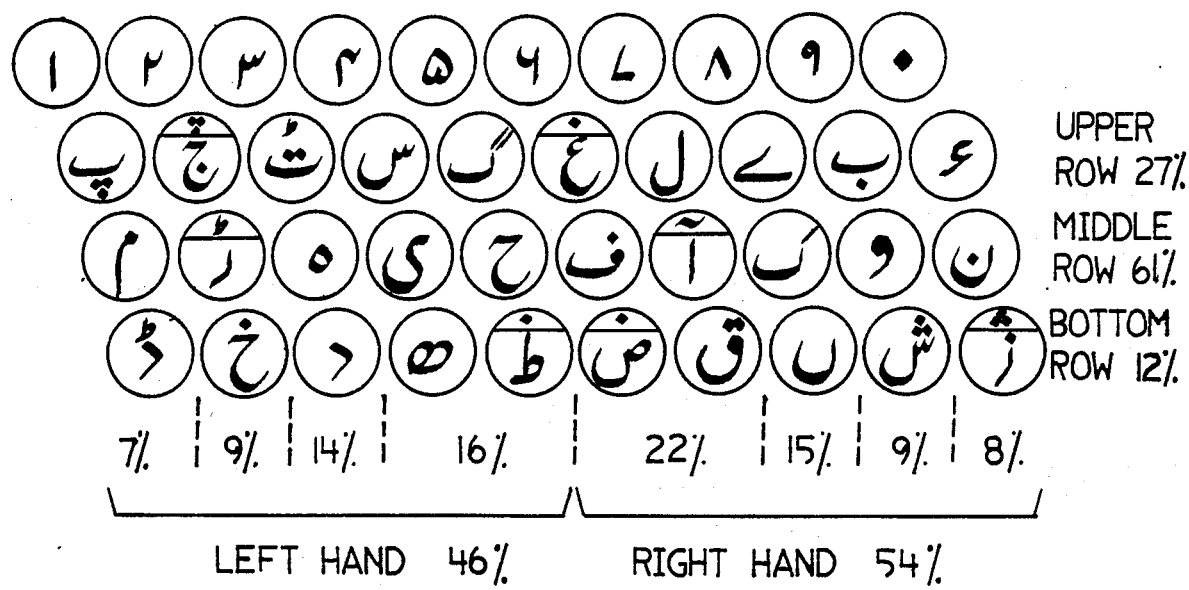
FIG. 1 is a planar view of a keyboard layout showing Urdu characters and numerals. Diacritic marks, where shown in the minor segments of the keys, represent a shift key usage for the character having the body shape shown on the major segment and the diacritic mark of the minor segment.
Figure 2:
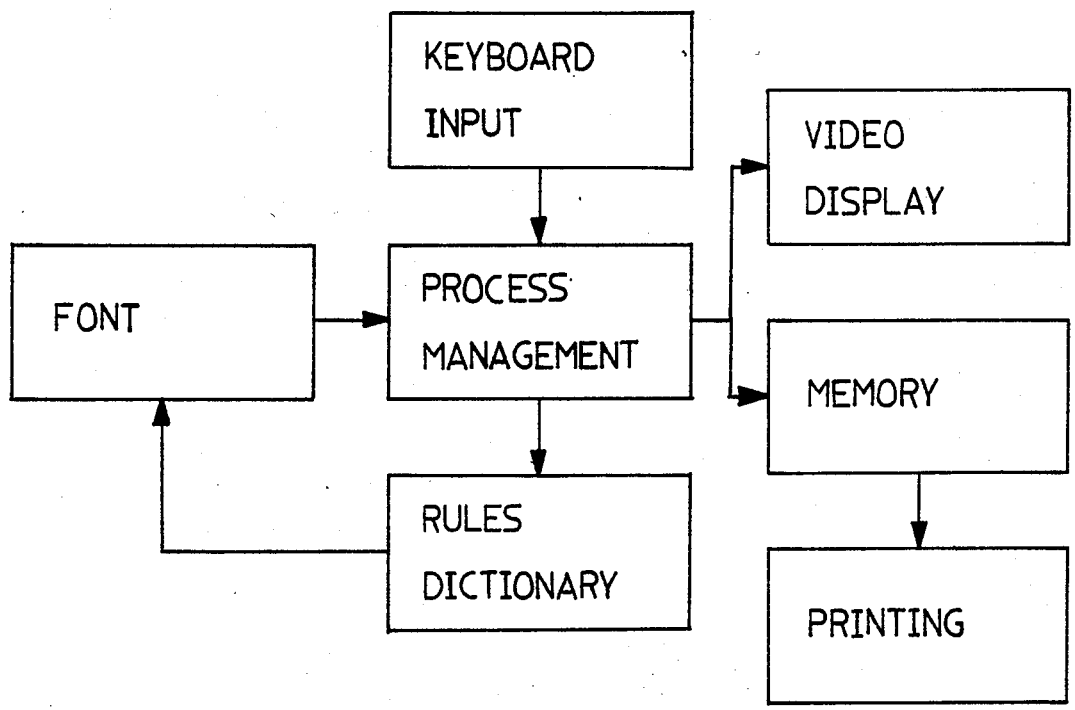
FIG. 2 is a block diagram of the system having keyboard input, video display output, and hard copy printer output.

The method of composition of the Urdu group of languages of the present invention uses a video terminal with a pixel addressable screen. The invention may be best understood by describing specifics of a preferred embodiment denominated as keyboard, font, rules dictionary, process management, special cases, and Araabs.

Keyboard

The input medium which is the Urdu character keyboard can either replace the existing QWERTY keyboard, or the same may be masked for displaying Urdu characters on the respective keys. The key allocation of the Urdu character set on the regular QWERTY keyboard is designed to permit maximum efficiency and ease of typing. This arrangement embodies the following features:

(a) The most frequently occurring character in random Urdu text are assigned to match the most agile fingers on the middle row of the keyboard. The right hand is preferred over the left hand, and the upper row is preferred over the bottom row.

(b) The characters occurring least frequently and having a similar character already assigned on a key are co-assigned on the shift mode to their look alike member on the key. This results in the minimum usage of the shift key during normal typing of text. Two look alike characters on the same key makes them easier to be displayed on the key-cap and also cause ease of recognition and committance to memory.

(c) The overall finger work load is rationalized to correlate the work load of each finger with its normal capability.

(d) Only the whole shapes of each character need to be allocated on a key as the decision to use the correct shape in a word is executed by the computer logic. This relieves the operator from the tiresome job of having to select the correct character shape. However, there are exceptions to the above situation where more than one version of a character can be validly used in a ligature, thereby making different words. For these situations the operator's decision is imperative. Such characters have been included in the standard character set and are treated as independent characters and awarded a key on the keyboard. These independent versions of characters are AMZ (Alif Mad Zabbar), DCH (Do Chashmi Hay) and NG (Noon Ghunna).

Font

The Urdu character set contains similarities between certain character groups. For example, the Bay family characters are not only very similar to each other but their bodies are look-alikes to part of the bodies of the Kaf and Fay families. Without sacrificing any "information content" and without losing any aesthetics the bodies of the Bay group of characters are made a sub-set of the Kaf and Fay families. Similarly in all other instances where the differences do not highlight any information content such differences are quashed and body shapes standardized. Working in this manner all but five characters are grouped in six Common Body Groups. The exceptions are the characters Meem, Ha, Humza, Bari Ye, and DCH which bear no resemblance to any Common Body Group or to each other. These characters constitute a single membered body group of their own. In each Common Body Group the rest part of the characters (character minus the common body) contains the difference necessary for its identification in the group. In some of these cases the difference is in the diacritic marks (diamonds, etc.) which do not connect with the body and for other cases it is in the piece of the character joined to the Common Body called the Rest Body, or the difference can be constituted by both the diacritic mark and the Rest Body, as in the case of the character Fay. The font contains digitized version of all Common Bodies, all Rest Bodies, and all Diacritic Marks. The careful and discrete standardization of shapes and removal of unnecessary dissimilarities not only reduces the memory size and handling requirement but also noticeably improves the style of the script.

Whole characters are composed by correctly juxtaposing their Common Bodies with Rest Bodies and Diacritic Marks as required. In the font the Rest Bodies are so designed that not only do they fit with the Common Bodies to give a true representation of the whole character but also they can be used to comprise a shosha. In a ligature these shoshas blend in smoothly with other shoshas in the correct proportion of size and body thickness. This commonality of shapes results in a considerable saving in memory space. Several other Rest Bodies are added to the font where dictated by a unique and different requirements of shosha shapes.

The Diacritic Marks are very important as they distinguish a character from others in the same family. In ligatures they are the main clue of the parent character. Earlier implementations of the Arabic script have not distinctified these small but high information bearing part of the script. In the font of this invention the diacritic shapes have been made more distinct and symmetrical, and the size increased enough for good recognition without being distractive to the reader.

In a ligature the last character usually occurs in its whole form. Its vertical placement is determined to be the same as when it occurs independently. Thereby the set of Common Bodies, Rest Bodies, and the Diacritic Marks are defined in the font so that each whole character always appear at its correct vertical placement whenever displayed, whether when occurring independently or when ending a ligature. When a character does not appear in its whole form when ending a ligature, it is identified as a "Spoiler" and a "Spoiler Form" definition is added to the font. There are four such type of exceptions: Diacritic Spoiler, Semi-spoiler, Conspoiler, and Noncon Spoiler.

When a character appearing at the end of a ligature requires its Diacritic Mark to be re-positioned to avoid clashing with shoshas or other Diacritic Marks, it is said to have a Diacritic Spoiler Form. Only the character Khay of the Jeem family appears in a Diacritic Spoiler Form in the two charactered ligature combinations. Its Diacritic Mark has two possible positions depending on the preceding shosha. Many other characters take a Diacritic Spoiler Form when occurring in higher-order ligatures.

In the Semi-spoiler case the character ending a ligature can occur either in its original shape or a single variant shape that depends on the preceding shosha in the ligature. Only the characters of the Ray family fall into this category. When a member of the Ray family in a two charactered ligature is preceded by a member of the Seen, Soad, Toye, An, Fay, Kkaf, Meem, Ha, or DCH families, it takes the Spoiler Form, otherwise it retains its normal whole shape. However in ligatures consisting of more than two characters Ray family always appears in the Spoiler Form.

For Con-spoilers, the Spoiler Form of the character is different from its original shape but the shape remains constant regardless of the preceding shoshas in the ligature. The character families in this category are Dal, An, and Ha.

Noncon Spoilers have many spoiler shapes. The basic shape is that of the whole character, but depending on the preceding shosha in the ligature various extents of the whole character shape are deleted. The families comprising this group are Choti Ye and Bari Ye.

Rules Dictionary

The process combines characters and shoshas into ligatures by means of rules specified in the rules dictionary. The dictionary of rules is divided into three classifications.

The shape of a character in a ligature depends upon its position in the ligature. When the shape of a shosha changes between its position in the beginning or middle of a ligature, the character is called "Noncon", otherwise it is a "Con". Noncons may be further divided into simple noncons, bay Noncons, and KAKL Noncons. Simple Noncons are characters which always display noncon properties regardless of neighboring shoshas in the ligature. The Simple Noncon families are An, Fay, Kkaf, and Ha. Bay Noncons are characters which display noncon properties when beginning a ligature and followed by characters from the Seen, Soad, Toye, An, Fay, Kkaf, Vow, and Choti Ye families. The Bay, Noon, and Choti Ye families are Bay Noncons. Kakl Noncons are characters which change their shape if they begin a ligature and when followed by characters belonging to the Kaf family followed immediately thereafter by either Alif or Laam. The families exhibiting Kakl Noncon properties are Bay, Noon, and Choti Ye.

A two charactered rules dictionary contains the rules for combining all the possible combinations of two characters with each other by accounting for the width and vertical placement of the two joining characters. These rules can be applied successively to join characters to the right end of the ligature if required. (The ligature formation takes place backwards i.e. left to right as will be explained in the next section). However when the ligature consists of more than two characters and if there is any Non-con, except at either end of the ligature, then the two charactered rules cannot be applied due to the different shapes of the Non-con in the ligature body. For such situations the three charactered rules dictionary is applicable which has the correct joining information of the Non-con in the middle flanked on each side by the other two characters. The total number of such permutations of characters is very large but the required number of dictionary entires is kept low by utilizing the commonality within character families.

In cases where a Non-con comes next to another Non-con and either of these Non-cons is not the extreme end character in the ligature, then another set of rules applies. A third dictionary called the "special dictionary" contains these specific rules to join a Non-con with a Non-con. Thus by the successive application of all these three dictionaries any ligature howsoever complex can be composed. There are occasions where the Diacritic Marks of the Bay, Noon, Choti Ye families clash with each other when three or more such characters appear next to each other in a ligature. This clashing of the Diacritic Marks is avoided by the Process Management program by repositioning the clashing diacritic marks when the situation warrants.

Process Management

Upon receiving a character input from the keyboard the PM (Process Management) invokes the respective dictionary entry which in turn retrieves the required Common Body, Rest Body and Diacritic Mark from the font and juxtaposes these parts to display the whole character at the proper height on the line of the text. The PM displays these characters from right to left starting from the top right corner of the screen. Subsequent character inputs are likewise displayed on the screen in whole shape next to each other. The horizontal distance between characters is governed by the width of matrix in which each character is defined. A cursor blinks at the right side of the first character entered indicating the start of a word. To form a word, the character input is followed by an operator entered space. Upon receipt of the space the PM activates its word forming process. Starting from the lastly entered character and going backwards, i.e.. left to right the PM searches for EOLs (End of Ligature) characters in the word. EOLs are those characters which can join on the left side of any character except another EOL but no other character can join to their own left. Whenever an EOL is encountered in a word, the ligature ends with the EOL. Thus all ligatures in the script either end with an EOL or by the entry of space which indicates the end of word command.

Upon finding an EOL in the character string of the word the PM breaks the word into the respective ligatures and commences ligature formation. By composing ligatures backwards, firstly the whole ligature gets anchored to its left ending character in the correct vertical placement as defined by its whole or spoiler shape in the Font, secondly the shape of the successive characters is usually determined by the character on its left. Any variations from this is handled by the Three Charactered and Special Dictionaries. Upon the entry of space by the operator the ligatures in the word are formed automatically and they replace the individual whole characters on the screen. The blinking cursor jumps to the space at the end of the word for a similar process for the next word. The horizontal spacing between ligature is determined by the PM by what is called the "space dictionary". This dictionary contains an entry for interligature spacing determined for all the permutations of character ending and beginning ligatures. Many such spacings are made identical by utilizing family similarities of characters without loss of style or readability thereby reducing the total entries required for this space dictionary. The single space which is entered at the end of the word results in a standard interword distance. Whole characters can thus be printed by entering a space after each character entry. Upon entering a series of words automatic word wrap takes place at the end of the line and a similar process is repeated for all subsequent lines till the screen is full and then scrolling takes place a line at a time to accommodate more text.

A preference among Urdu writers is to combine the ligatures of commonly occurring pairs of words. This reduces the space and time to write the words and does not cause any ambiguity. These words can easily be combined in this process by not entering a space between the pair of words.

The numerals in Urdu occur from left to right i.e. opposite to the script, even when embedded in the script. When typed the numerals shift to the left on the screen to maintain their correct order in the display.

Characters displayed on the screen not yet reduced to script or numerals can be deleted by a delete key which deletes the extreme left character or numeral with each delete key activation. As the script is displayed on the screen it is also stored in the memory for future editing, displaying and printing.

Special Cases

The word Allah is basically an Arabic word and does not follow the rules of Urdu script. But its popular usage in Urdu necessitiates the provision to print this word. For this purpose the whole word has been bit-mapped and stored in the font and assigned to the "P" key in the shift mode.

Meem is one of the tallest characters in the language and when it ends ligatures, the previous shoshas stack up on top of Meem's whole shape. This makes the whole ligature very tall resulting in a possible collision with the upper line of text. To overcome this problem and not to unnecessarily increase the interline gap, the PM lowers such tall ligatures ending in Meem so that there is no collision with the upper line of text. Any collision by the thin stem of Meem occurring with the lower line of text when such a ligature is moved down is made permissable.

Araabs

Araabs are special diacritic marks having means for identifying vowel sounds. When Araabs are to be used, they are typed after the character with which they are used. For example, if the word Bil has to be typed in, then the following keys will be depressed in sequence:

| CHAR-ACTER | ARAAB | CHARACTER | ARAAB (if required) |
| --- | --- | --- | --- |
| BAY | ZER | LAAM | JAZM |

In the unscripted form the Zer will appear underneath Bay and the Jazm over Laam. In the scripted form the Zer will appear below the shosha of Bay and the Jazm retains its position over the whole space of Laam. The Araab shapes are stored in the Font and their processing is done by the PM.

While the within invention has been described as required by law in connection with certain preferred embodiments thereof, it is to be understood that the foregoing particularization and detail have been for the purposes of description and illustration only and do not in any way limit the scope of the invention as it is more precisely defined in the subjoined claims.

What is claimed:

1. A method for computer composing the Urdu group of languages in true Nastaliq script in a highly esthetic manner conforming to the style and elegance of the traditional norms and conventions of the script, which comprises:
   (a) expanding the character set of the Urdu group of languages by the inclusion of additional whole characters and allocating a key for said characters on a computer keyboard entry device, said keyboard having Urdu characters mapped to said keys by matching frequency of occurrence of a character with finger agility, by pattern recognition of similar characters, by rationalizing finger workload, and by minimal use of a shift key;
   (b) storing in the computer memory digitized constituent elements of every whole character of the expanded set of said Urdu group of languages and every shosha having a representative shape of a whole character when joined together in a ligature as a combination of a Common Body Group having common body shapes, a Rest Body Group having a portion of a character joined with their respective common body to complete the whole character body, and a Diacritic Mark Group having means for identifying a specific member of a particular character family;
   (c) defining a set of rules and their application in a computer program for automatically selecting, composing, and combining the computer stored characters and shoshas, for detecting End of Ligature special characters for ending ligatures, for minimum interligature spacing, for proper vertical positioning of characters and ligatures, and for correct positioning of Araabs having means for identifying Urdu vowel sounds, all according to the conventions of the script;
   (d) entering into the computer with the keyboard entry device an interword space after each character to compose the whole character and omitting said interword space for combining commonly occurring pairs of words;
   (e) bit mapping the wholly formed word "Allah" and assigning said word a key on said keyboard;
   (f) displaying on the computer screen whole characters from right to left with a screen blinking cursor in a space at the beginning of a word, formation of the word by entry of space, and movement of the cursor to the space at the end of the word;
   (g) shifting numerals from right to left on the computer display screen thereby maintaining their left to right order as entered; and
   (h) repositioning tall ligatures for proper vertical and language orientation on the computer display screen to avoid interline overlap.

2. A method for computer composing the Urdu group of languages in Nastaliq script according to claim 1, wherein the shapes of diacritic marks have been enlarged and made symmetrical.

3. A method for computer composing the Urdu group of languages in Nastaliq script according to claim 1, wherein the set of computer rules are classified into a two charactered rule dictionary, three charactered rule dictionary, and a special dictionary.

4. A method for computer composing the Urdu group of languages in Nastaliq script according to claim 3, wherein means are provided to utilize each dictionary for ligature formation.

5. A method for computer composing the Urdu group of languages in Nastaliq script according to claim 1, wherein characters are classified as Cons, Simple Noncons, Bay Noncons, Kakl Noncons, Diacritic Spoilers, Semispoilers, Con-spoilers, and Noncon Spoilers and are processed in accordance with the rules contained in said dictionaries.

6. A method for computer composing the Urdu group of languages in Nastaliq script according to claim 1, wherein successive applications of the rules contained dictionaries are used to construct ligatures and words starting from left to right.

7. A method for computer composing the Urdu group of languages in Nastaliq script according to claim 1. wherein the size of the rules dictionary is reduced by utilizing similarities contained in the families of characters.

8. A method for computer composing the Urdu group of languages in Nastaliq script according to claim 1, wherein certain characters are classified as End of Ligature characters and ligature formation in a word is based on the end of ligatures.

9. A method for computer composing the Urdu group of languages in Nastaliq script according to claim 1, wherein tall ligatures ending in Meem are lowered to avoid clashing with an upper line of text.

10. A method for computer composing the Urdu group of languages in Nastaliq script according to claim 1, wherein the vertical placement of characters are classified by way of specified baselines when the character occurs independently or when the character ends a ligature either in the whole form or the spoiler form.

11. A method for computer composing the Urdu group of languages in Nastaliq script according to claim 1, wherein the Q key position of the standard computer keyboard is assigned to the character Pay, the W key position is assigned to Jeem, the shift mode W key position is assigned to Chey, the E key position is assigned to Tay, the shift mode E key position is assigned to Ttay, the R key position is assigned to Seen, the T key position is assigned to Gaf, the Y key position is assigned to An, the shift mode Y key position is assigned to Ghen, the U key position is assigned to Laam, the I key position is assigned to Bari Ye, the 0 key position is assigned to Bay, the shift mode 0 key position is assigned to Say, the P key position is assigned to Humza, the shift mode P key position is assigned to Allah, the A key position is assigned to Meem, the S key position is assigned to Ray, the shift mode S key position is assigned to Rray, the D key position is assigned to Ha, the F key position is assigned to Choti Ye, the G key position is assigned to Hay, the H key position is assigned to Fay, the J key position is assigned to Alif, the shift mode J key position is assigned to AMZ, the K key position is assigned to KAF, the L key position is assigned to Vow, the ; key position is assigned to Noon, the Z key position is assigned to Ddal, the X key position is assigned to Khay, the C key position is assigned to Dal, the shift mode C key position is assigned to Zal, the V key position is assigned to DCH, the B key position is assigned to Toye, the shift mode B key position is assigned to Zoye, the N key position is assigned to Soad, the shift mode N key position is assigned to Zoad, the M key position is assigned to Kkaf, the , key position is assigned to NG, and . key position is assigned to Sheen.

12. A method for computer composing the Urdu group of languages in Nastaliq script according to claim 1, wherein the additional whole characters are Alif Mad Zabbar, Do Chashmi Hay, and Noon Ghunna.

13. A method for computer composing the Urdu group of languages in true Nastaliq script in a highly esthetic manner conforming to the style and elegance of the traditional norms and conventions of the script, which comprises:
   (a) expanding the character set of the Urdu Group of languages by the inclusion of additional whole characters and allocating a key for said characters on a computer keyboard entry device, said keyboard having Urdu characters, but adaptable to having characters of other languages, mapped to said keys by matching frequency of occurrence of a character with finger agility, by pattern recognition of similar characters, by rationalizing finger workload, and by minimal use of a shift key.
   (b) storing in the computer memory digitized constituent elements of every whole character of the expanded set of said Urdu group of languages and every shosha having a representative shape of a whole character when joined together in a ligature as a combination of a Common Body Group having common body shapes, a Rest Body Group having a portion of a character joined with their respective common body to complete the whole character body, and a Diacritic Mark Group having means for identifying a specific member of a particular character family;
   (c) defining a set of rules and their application in a computer program for automatically selecting, composing, and combining the computer stored characters and shoshas, for detecting End of Ligature special characters for ending ligatures, for minimum interligature spacing, for proper vertical positioning of characters and ligatures, and for correct positioning of Araabs having means for identifying Urdu vowel sounds, all according to the conventions of the script;
   (d) entering into the computer with the keyboard entry device an interword space after each character to compose the whole character and omitting said interword space for combining commonly occurring pairs of words;
   (e) bit mapping the wholly formed word "Allah" and assigning said word a key on said keyboard;
   (f) displaying on the computer screen whole characters from right to left with a screen blinking cursor in a space at the beginning of a word, formation of the word by entry of space, and movement of the cursor to the space at the end of the word;
   (g) shifting numerals from right to left on the computer display screen thereby maintaining their left to right order as entered; and
   (h) respositioning tall ligatures for proper vertical and language orientation on the computer display screen to avoid interline overlap.

* * * * *